US012510250B2

(12) United States Patent
San Juan et al.

(10) Patent No.: US 12,510,250 B2
(45) Date of Patent: Dec. 30, 2025

(54) AUTOMATIC BIOMETRIC DOOR LOCK

(71) Applicant: B/E Aerospace, Inc., Winston Salem, NC (US)

(72) Inventors: Ferdinand San Juan, Santo Tomas (PH); Aireen Perez, Santa Rosa (PH); Christian Paule Hribar, Calamba (PH); Maricar Inocencio, Mandaluyong (PH); Aristotle Tuzon, Calamba (PH)

(73) Assignee: B/E AEROSPACE, INC., Winston Salem, NC (US)

( * ) Notice: Subject to any disclaimer, the term of this patent is extended or adjusted under 35 U.S.C. 154(b) by 57 days.

(21) Appl. No.: 18/408,823

(22) Filed: Jan. 10, 2024

(65) Prior Publication Data

US 2024/0230105 A1 Jul. 11, 2024

(30) Foreign Application Priority Data

Jan. 11, 2023 (EP) .................................... 23151196

(51) Int. Cl.
*G07C 9/37* (2020.01)
*F24C 15/02* (2006.01)

(52) U.S. Cl.
CPC .............. *F24C 15/022* (2013.01); *G07C 9/37* (2020.01)

(58) Field of Classification Search
CPC .......... F24C 15/022; F24C 7/085; G07C 9/37; G07C 9/00896; G07C 9/00563; G07C 9/00182; G07F 17/0014; B32B 27/065
See application file for complete search history.

(56) References Cited

U.S. PATENT DOCUMENTS 5,690,206 A * 11/1997 Carroll, Jr. .............. D06F 37/42 200/61.7
10,205,339 B2 2/2019 Augustat et al.
2004/0160335 A1 8/2004 Reitmeier
2012/0203376 A1* 8/2012 Savage ................ G06Q 10/087 700/214
2013/0334369 A1 12/2013 Schliwa et al.
2016/0076776 A1 3/2016 Gardner et al.
2019/0210730 A1 7/2019 Riedel et al.
2019/0309548 A1 10/2019 Laconte
2021/0285268 A1 9/2021 Panjer
2022/0410542 A1* 12/2022 Epskamp ............... B64D 11/04

FOREIGN PATENT DOCUMENTS

CN 111335747 A 6/2020
EP 3725684 A2 10/2020
EP 3725684 A3 1/2021

OTHER PUBLICATIONS

Abstract for CN111335747 (A), Published: Jun. 26, 2020, 1 page.
European Search Report for Application No. 23151196.5, mailed Jun. 6, 2023, 9 pages.
European Office Action for Application No. 23151196.5, mailed May 28, 2025, 9 pages.

* cited by examiner

*Primary Examiner* — Vernal U Brown
(74) *Attorney, Agent, or Firm* — CANTOR COLBURN LLP

(57) ABSTRACT

A door locking system for a galley insert oven. The system includes a primary latch that is moved by a user in use to open the oven door and a secondary latch provided inside the oven. The system also includes a biometric device installed relative to the primary latch such that activation of the biometric device results in movement of the secondary latch.

12 Claims, 4 Drawing Sheets

AUTOMATIC BIOMETRIC DOOR LOCK

CROSS REFERENCE TO RELATED APPLICATIONS

This application claims priority to European patent application Ser. No. 23/151,196.5 filed Jan. 11, 2023, the entire contents of which is incorporated herein by reference.

FIELD

The examples disclosed herein relate to automatic door locks.

BACKGROUND

Door locks may be used for a variety of different types of doors. For example, current locks on an aircraft use a secondary mechanical door latch to lock doors on devices such as ovens, hatches etc.

SUMMARY

According to a first aspect, a door locking system for a galley oven insert is described herein and comprises a primary latch that is moved by a user in use to open the door; and a biometric device installed relative to said primary latch such that activation of said biometric device results in locking or unlocking of said door.

A door locking system for a galley oven insert is described herein comprising a primary latch that is moved by a user in use to open the door of the locking system, and secondary latch that is provided internally of said oven, a biometric device installed relative to said primary and secondary latch such that activation of said biometric device results in movement of said secondary latch. In this example the movement of the secondary latch results in the locking or unlocking of the oven door.

In some examples described herein, the biometric device may detect and confirm a registered biometric feature.

In some examples described herein, the biometric feature may comprise one or more that one of a fingerprint, facial features, eye features.

In some examples described herein, recognition of an authorised biometric feature by the biometric device may result in movement of an internal actuating gear, which actuates the secondary latch.

In some examples described herein, the secondary latch may comprise a secondary latch mechanism comprising a striker slider that locks or unlocks a door on which the locking mechanism is installed.

In some examples described herein, n actuating motor or device may be provided within the secondary latch mechanism that is configured to trigger the secondary Slider mechanism of the secondary latch when a biometric feature is detected by the biometric device.

According to a second aspect, a method for manufacturing a door locking system for a galley insert oven is described herein comprising: providing a galley insert oven having a door, providing a primary latch that is moved by a user in use to open the door; installing a biometric device relative to said primary latch such that activation of said biometric device results in said door being configured to be locked or unlocked.

A method for manufacturing any of the door locking systems for a galley insert oven as described herein is also described. The method comprises: providing said galley insert oven, said oven having a door, providing a primary latch that is moved by a user in use to open the door; and providing a secondary latch internally of said oven; installing a biometric device relative to said primary latch and said secondary latch such that activation of said biometric device results in movement of said secondary latch. In this example, movement of the secondary latch results in the door being unlocked or locked.

In some examples said step of installing said biometric device may comprise installing a biometric device that is configured to detect and confirm a registered biometric feature.

In some examples, the biometric feature may comprise one or more that one of a fingerprint, facial features, eye features.

In some examples recognition of an authorised biometric feature by said biometric device may result in movement of an internal actuating gear, which actuates the secondary latch.

In some examples, said step of providing said secondary latch may comprise providing a secondary latch that comprises a secondary latch mechanism comprising a striker slider that locks or unlocks a door on which the locking mechanism is installed.

In some examples, the method may further comprise providing an actuating motor or device within the secondary latch mechanism that is configured to trigger the secondary Slider mechanism of the secondary latch when a biometric feature is detected by the biometric device.

BRIEF DESCRIPTION OF THE DRAWINGS

The following descriptions should not be considered limiting in any way. With reference to the accompanying drawings, like elements are numbered alike.

DETAILED DESCRIPTION

The examples described herein relate to door locks and in particular automatic door locks. Door locks are currently used on a variety of different devices. For example, they are used in vehicles such as an aircraft, for locking oven doors, hatches etc. The door locks described herein could be used to prevent an attack such as a terrorist attack in a vehicle such as an aircraft, wherein a heat generating product such as an oven could be used as a detonating device. In this way, the locks described herein may prevent any such future attacks.

Although the description here is given mainly in relation to an oven door of an aircraft, the locking system described herein could be used for any door wherein it is not intended that unauthorised people are able to unlock the door.

The door locking system for an oven galley insert door may comprise a locking system wherein a biometric device is provided, such that the oven door cannot open unless a recognised biometric feature is detected.

Figure 1:
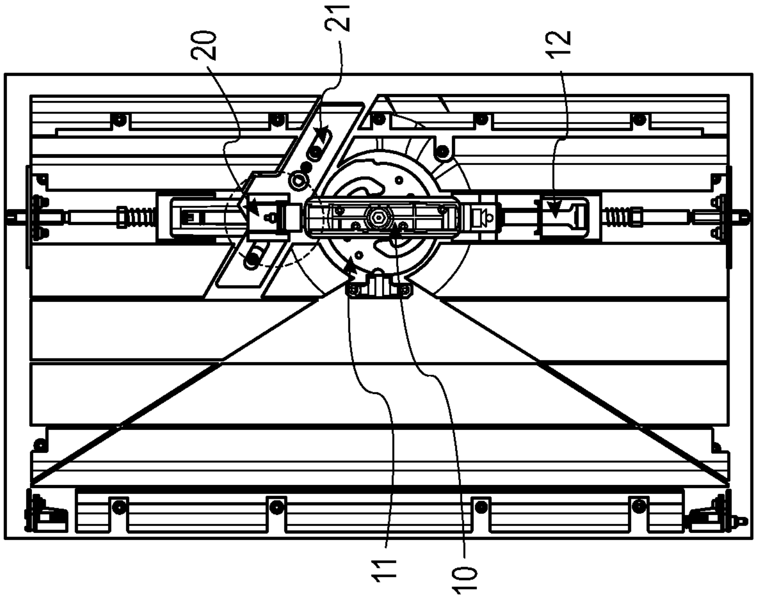
FIG. 1 shows the internal components of a door lock having a primary and secondary latch.

The internal components and functioning of one type of door lock that is used for an oven galley insert door having a primary and secondary latch is shown in FIG. 1. The biometric device can, however, also be used with door locking systems having different components and the examples described herein are not limited to this one type of door locking system.

As can be seen in FIG. 1, the locking system comprises a primary latch 10 that is moved by the user in order to open the door. The internal actuating gear 11 translates movement to a push rod 12 which is moved in a vertical direction as shown in FIG. 1. This, in turn, actuates a secondary latch 20, the mechanism 21 of which can be seen in FIG. 1. The secondary latch mechanism 21 comprises a striker slider mechanism that moves relative to the primary latch 10 to allow the primary latch 10 to open the door.

Figure 2:
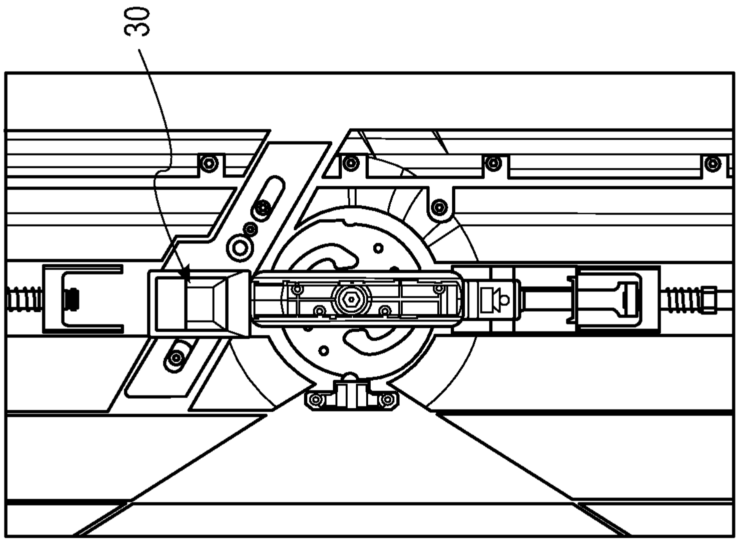
FIG. 2 shows a door lock having a primary and secondary latch and a biometric device installed which can actuate the secondary latch.

In the locking system shown in FIG. 2, a biometric device such as an automatic biometric lock 30 is incorporated into the locking system. The incorporation of the biometric device 30 into the locking system can be configured such that it activates the secondary lock 20 of the locking system and can only be opened by the detection of a registered fingerprint (or other biometric features) of the cabin crew. This therefore prevents unauthorised use of the heat generating device. In this example, in order to trigger the Striker Slider mechanism 21 of the secondary latch, an actuating motor or device is provided within the secondary latch mechanism 21 so that once a fingerprint is detected the actuator motor or device will Lock or Unlock the mechanism. The automatic biometric lock 30 is shown in FIG. 2.

Figure 3:
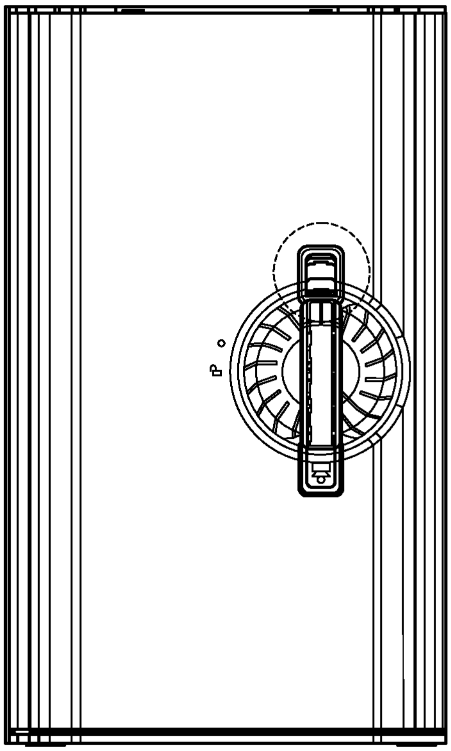
FIG. 3 shows a door lock wherein the biometric device indicates that the door is in the unlocked position.
Figure 4:
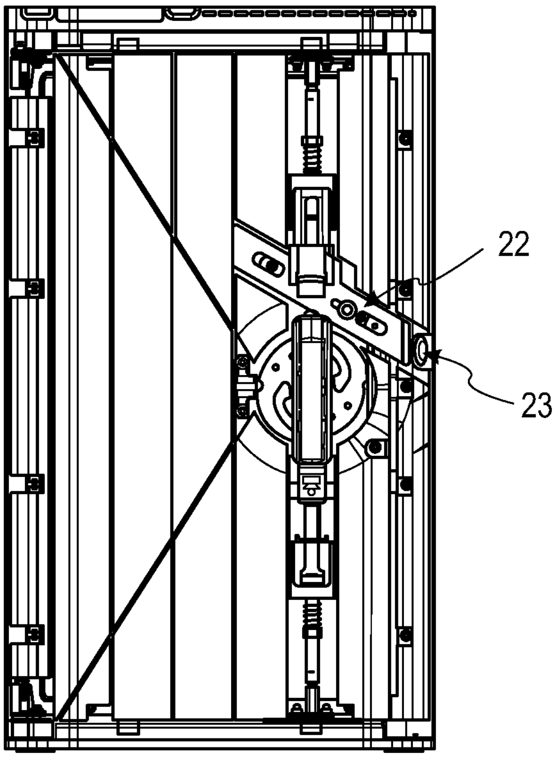
FIG. 4 shows the internal components of a door lock that is in the unlocked position.

As depicted in FIG. 4, the striker slider mechanism may comprise a striker 23 and a striker slider 22. In some examples, the biometric device 30 may be configured to indicate to the user whether or not the lock is in the unlocked position. For example, as shown in FIG. 3, the biometric device 30 may glow red when locked, or may show an icon indicating that it is locked. In this unlocked position, the striker slider 21 is not engaged with the striker 22 and the door is unlocked.

Figure 5:
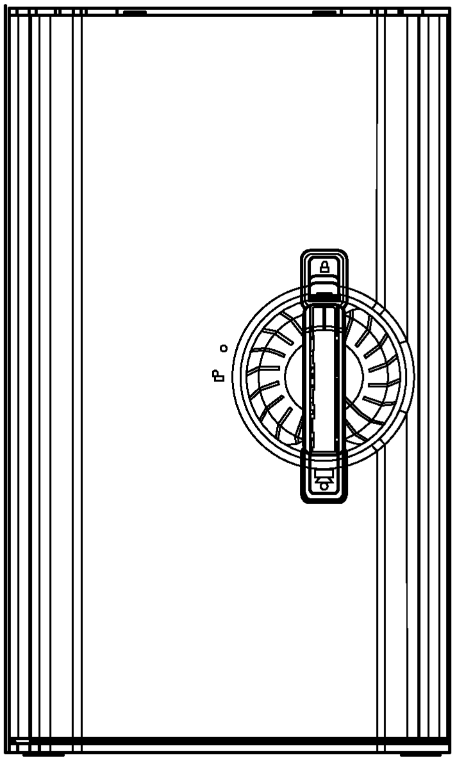
FIG. 5 shows a door lock wherein the biometric device indicates that the door is in the locked position.
Figure 6:
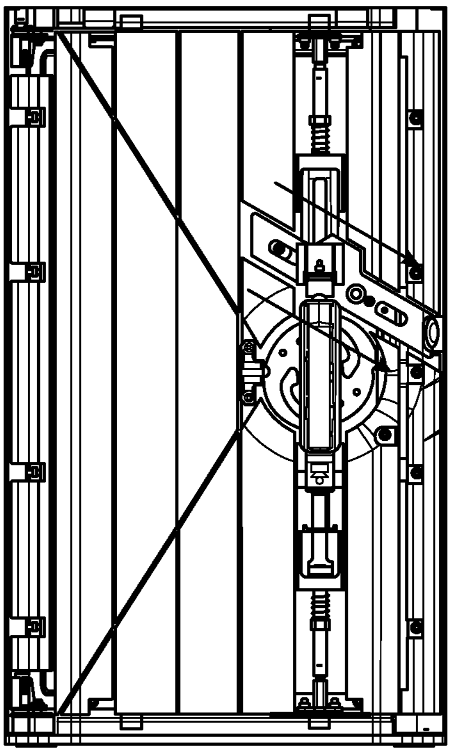
FIG. 6 shows the internal components of a door lock that is in the locked position.

FIGS. 5 and 6 depict the locking mechanism when the door is in the locked position. As can be seen in FIG. 5, in the locked position, the biometric device 30 may indicate to the user, e.g. with colour, icon, etc, that the door is locked. As shown in FIG. 6, when in the locked position, the striker slider 21 is in a position wherein it engages the striker 22.

Figure 7C:
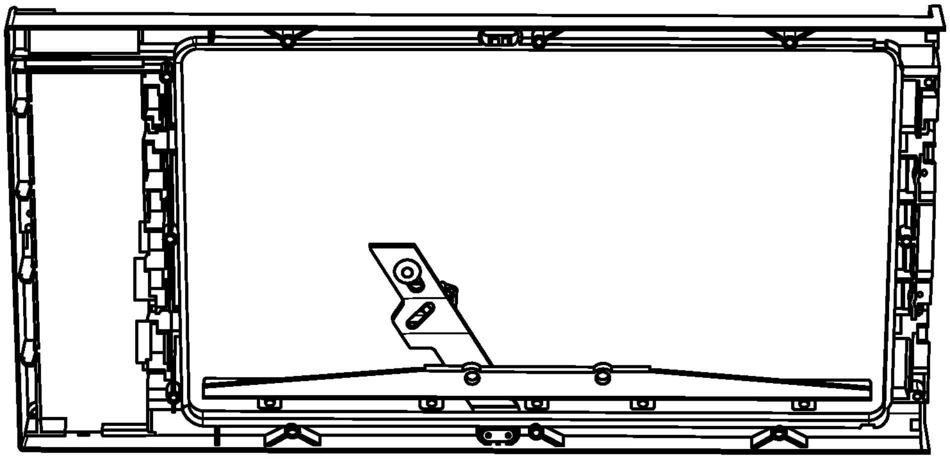
FIG. 7*c* depicts a back view of a traditional door locking system.
Figure 7B:
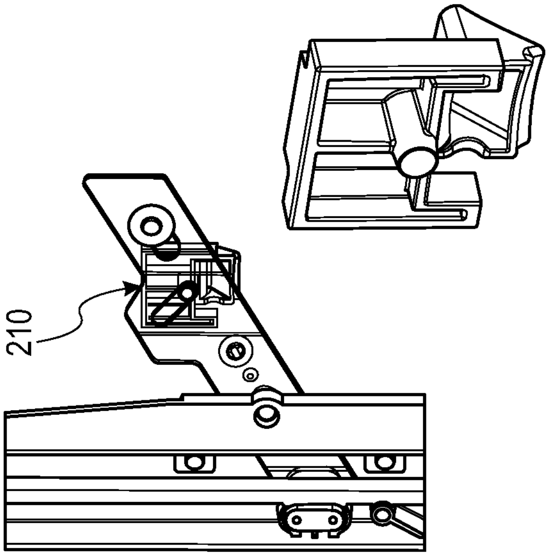
FIG. 7*b* depicts a closer view of the traditional door locking system of FIG. 7*a;*
Figure 7A:
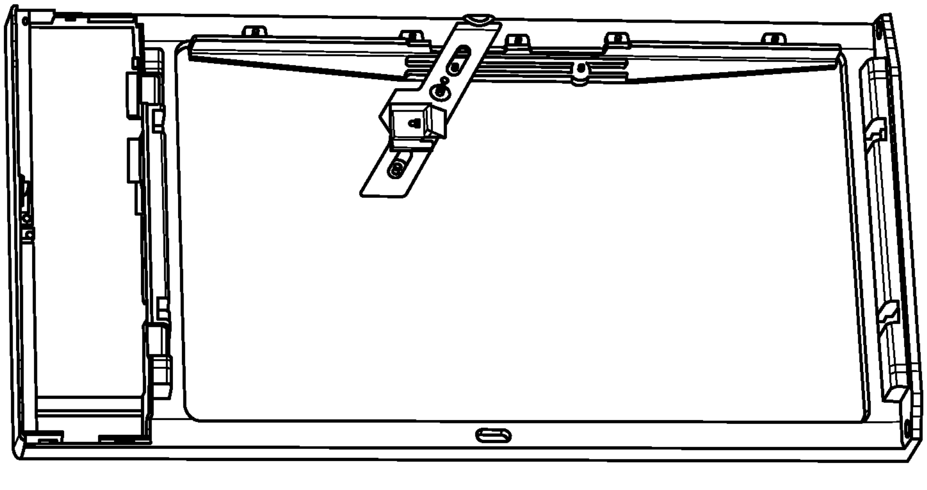
FIG. 7*a* depicts a front view of a traditional door locking system.

FIG. 7*a* depicts a front view of a traditional door locking system. The door locking system has a secondary latch 210 that has a manual mechanism. FIG. 7*c* depicts a back view of the same traditional locking system. As can be seen in FIG. 7*b*, the feature 210 is replaced with a biometric device in the new examples described herein.

Figure 8B:
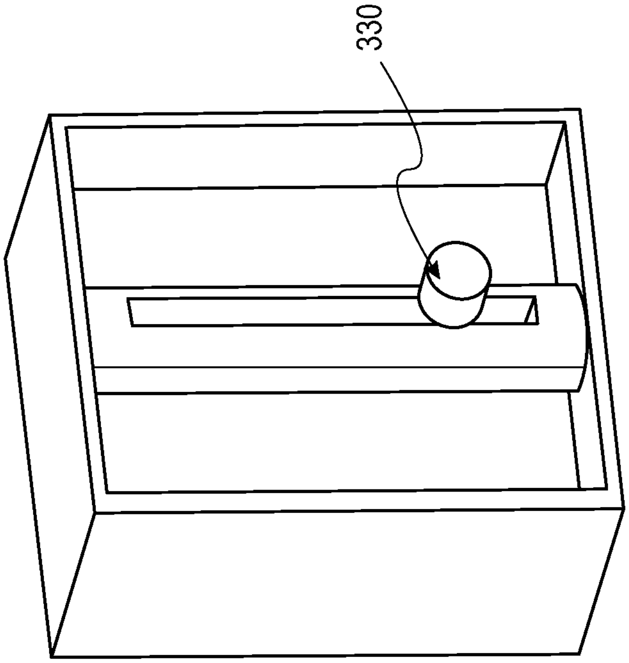
FIG. 8*b* depicts the components of the biometric device of FIG. 8*a.*
Figure 8A:
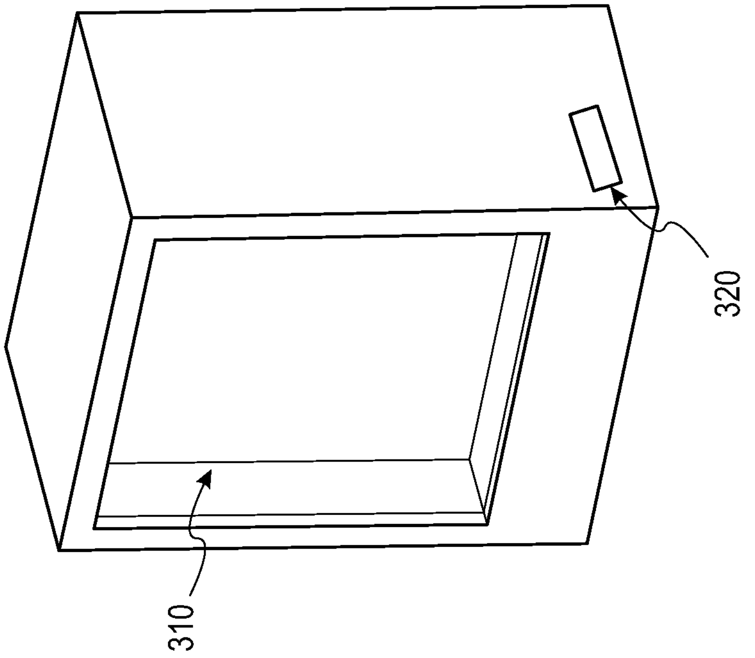
FIG. 8*a* depicts a biometric device that may be used in the examples described herein.

FIG. 8*a* depicts a biometric device 30 that may be used in the examples described herein. The device may have a fingerprint screen 310. In some examples, a USB port 320 may be provided. FIG. 8*b* depicts the components of the biometric device of FIG. 8*a*, showing the cylinder 330 that may be configured to move up and down and thereby actuate the secondary latch in use. Internally, the biometric device may have a series of gears that are controlled by electronics and which may be triggered by the authorized biometric feature, e.g. Fingerprint. The trigger would make the cylinder 330 move up and down to actuate the slider for locking and unlocking the oven door. A memory chip may also be included to store the biometric data.

In summary, the installation of the Automatic Biometric Lock device 30 to the door locking system will therefore activate the Secondary Door Latch through locking and unlocking. It can only be opened by the registered fingerprint, or other biometric indication (e.g. facial, eye recognition etc.) of the authorized person, e.g. cabin crew. This will prevent the unauthorized use or operation of the Oven.

The door locking system for the galley insert oven may be manufactured via a method that comprises providing the galley insert oven, wherein the oven has a door, providing the primary latch 10 as described above, that is moved by a user in use to open the door; and providing a secondary latch 20, as also described above, such that it is positioned internally of the oven. The method may further involve installing the biometric device as described above relative to the primary latch and the secondary latch such that, in use, activation of the biometric device results in movement of the secondary latch 20.

As described above, the biometric device that is installed may be configured to detect and confirm a registered biometric feature.

As also described above, the biometric feature may comprise one or more that one of a fingerprint, facial features, eye features and recognition of an authorised biometric feature by the biometric device may result in movement of an internal actuating gear 11, which actuates the secondary latch 20.

The method of manufacture may further comprise providing a secondary latch that comprises a secondary latch mechanism comprising a striker slider that locks or unlocks a door on which the locking mechanism is installed.

The method of manufacture may further comprise providing an actuating motor or device within the secondary latch mechanism 21 that is configured to trigger the secondary Slider mechanism 21 of the secondary latch when a biometric feature is detected by the biometric device 30.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A door locking system for a galley insert oven, comprising:

a primary latch that is moved by a user in use to open an oven door of the oven;

a biometric device installed relative to said primary latch such that activation of said biometric device results in locking or unlocking of the oven door;

a secondary latch provided internally of said oven;

wherein the biometric device is installed relative to said primary latch and said secondary latch such that activation of said biometric device results in movement of the secondary latch.

2. The locking system of claim 1, wherein said biometric device detects and confirms a registered biometric feature.

3. The locking system of claim 2 wherein the biometric feature comprises one or more that one of: a fingerprint, facial features, and eye features.

4. The locking system of claim 2, wherein recognition of an authorised biometric feature by said biometric device results in movement of an internal actuating gear, which actuates the secondary latch.

5. The locking system of claim 1, wherein the secondary latch comprises a secondary latch mechanism comprising:

a striker slider that locks or unlocks a door on which the locking mechanism is installed.

6. The locking mechanism of claim 5, further comprising:

an actuating motor or device within the secondary latch mechanism that is configured to trigger the striker slider of the secondary latch mechanism when a biometric feature is detected by the biometric device.

7. A method for manufacturing a door locking system for a galley insert oven, comprising:

providing said galley insert oven, said oven having an oven door, providing a primary latch that is moved by a user in use to open the oven door;

installing a biometric device relative to said primary latch that activation of said biometric device results in the oven door being configured to be locked or unlocked; and providing a secondary latch inside the oven;

wherein installing the biometric device comprises:

installing the biometric device relative to the primary latch and the secondary latch such that activation of the biometric device results in movement of the secondary latch.

8. The method of claim 7, wherein the biometric device t is configured to detect and confirm a registered biometric feature.

9. The method of claim 8, wherein the biometric feature comprises one or more that one of: a fingerprint, facial features, and eye features.

10. The method of claim 8, wherein recognition of an authorised biometric feature by the biometric device results in movement of an internal actuating gear that actuates the secondary latch.

11. The method of 7, wherein providing the secondary latch that comprises a secondary latch mechanism that comprises a striker slider that locks or unlocks a door on which the locking mechanism is installed.

12. The method of claim 11, further comprising:

providing an actuating motor or device within the secondary latch mechanism that is configured to trigger the strike slider of the secondary latch mechanism when a biometric feature is detected by the biometric device.

* * * * *